United States Patent
Fessou et al.

(10) Patent No.: US 7,121,792 B1
(45) Date of Patent: Oct. 17, 2006

(54) NOZZLE VANE WITH TWO SLOPES

(75) Inventors: Philippe Fessou, Melun (FR); Mario Blozovski, Boussy Saint Antoine (FR); Herve Quiniou, Mennecy (FR)

(73) Assignee: SNECMA Moteurs, Paris (FR)

( * ) Notice: Subject to any disclaimer, the term of this patent is extended or adjusted under 35 U.S.C. 154(b) by 46 days.

(21) Appl. No.: 10/808,275

(22) Filed: Mar. 25, 2004

(30) Foreign Application Priority Data

Mar. 27, 2003 (FR) .................................. 03 03754

(51) Int. Cl.
*F01D 1/02* (2006.01)
*F01D 9/00* (2006.01)

(52) U.S. Cl. ................................... 415/191; 415/208.2

(58) Field of Classification Search ........ 415/191–192, 415/211.2, 208.1, 208.2, 210.1
See application file for complete search history.

(56) References Cited

U.S. PATENT DOCUMENTS

| 3,745,629 | A | 7/1973 | Pask et al. |
| 6,195,983 | B1 * | 3/2001 | Wadia et al. ............... 60/226.1 |
| 6,312,219 | B1 * | 11/2001 | Wood et al. ................ 415/191 |
| 6,491,493 | B1 | 12/2002 | Watanabe et al. |
| 6,508,630 | B1 * | 1/2003 | Liu et al. ................... 416/228 |
| 6,554,569 | B1 * | 4/2003 | Decker et al. .............. 415/192 |

FOREIGN PATENT DOCUMENTS

| EP | 0 441 097 | 8/1991 |
| EP | 1 098 092 | 5/2001 |
| EP | 1 106 836 | 6/2001 |

\* cited by examiner

*Primary Examiner*—Edward K. Look
*Assistant Examiner*—Devin Hanan
(74) *Attorney, Agent, or Firm*—Oblon, Spivak, McClelland, Maier & Neustadt, P.C.

(57) ABSTRACT

A nozzle vane for a rotary disk of a turbomachine, the vane comprising pressure side and suction side surfaces extending radially between a base and a tip and longitudinally between a leading edge and a trailing edge, with a plurality of vane sections having centers of gravity aligned along a stacking axis, the vane presenting a lower portion, an intermediate portion, and an upper portion, the lower portion extending radially between the base of the vane and a lower limit of the intermediate portion, and the upper portion extending radially between an upper limit of the intermediate portion and the tip of the vane, the stacking axis presenting, in the lower and upper portions, a tangential component that is substantially radial, and in the intermediate portion, a tangential component with two slopes.

20 Claims, 2 Drawing Sheets

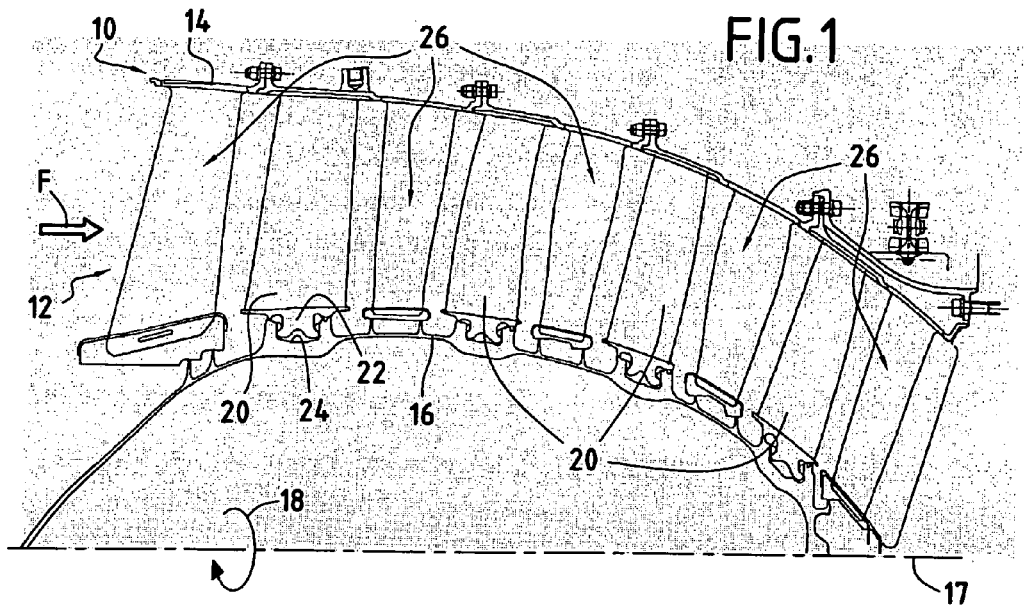
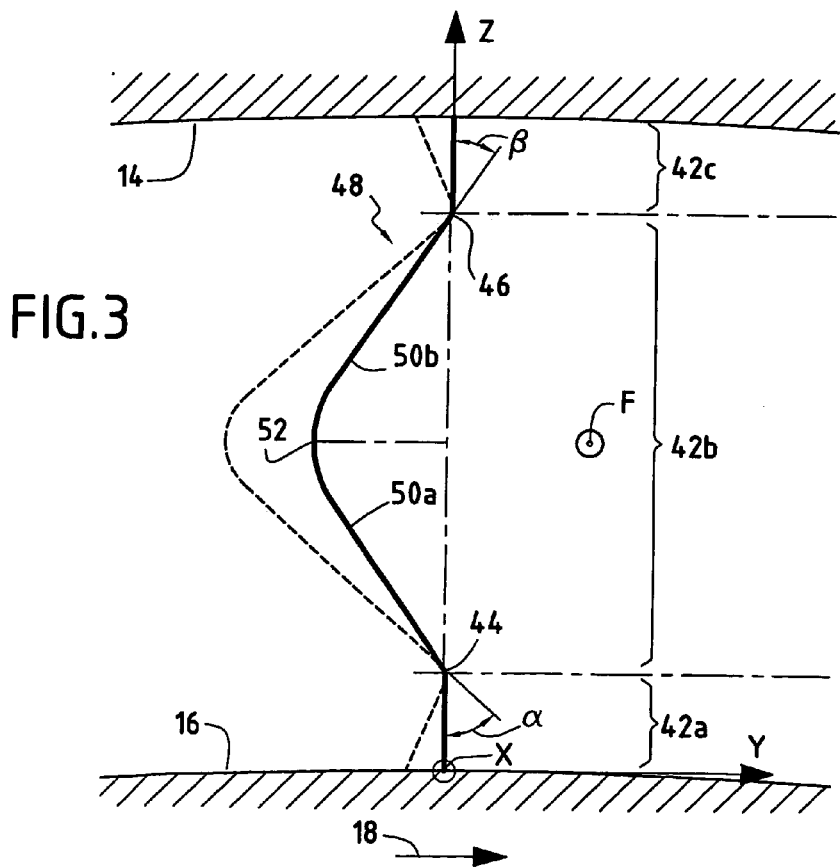

NOZZLE VANE WITH TWO SLOPES

BACKGROUND OF THE INVENTION

The present invention relates to the general field of gas turbine engines, and more particularly to the compressors of such engines.

A gas turbine engine comprises a combustion part and a turbine part disposed downstream from a compression part. An annular passage for passing a gas flow extends axially through these various parts of the engine. The gas flow is compressed by the compression part prior to being mixed and burnt with fuel in the combustion part. The gases coming from the combustion part then pass through the turbine part so as to provide propulsion thrust and drive the turbines. The elements of the compression part are constrained to rotate with the turbines by a drive shaft.

The compression part of a gas turbine engine may comprise three axial compressors so as to increase compression of the gas flow: a fan; a low pressure compressor; and a high pressure compressor. Each compressor is typically constituted by a rotary portion (a rotor) a stationary portion (a stator), and a casing. A rotor inner shroud and a stator outer shroud define the radial boundaries of the annular section of the flow of gas passing through the compressor. The rotor comprises a plurality of rows of moving blades which extend radially through the flow section from the inner shroud to the vicinity of the outer shroud. The stator comprises a plurality of rows of stationary vanes extending from the outer shroud, likewise through the flow section between the outer shroud to the inner shroud. Each nozzle-forming row of stationary vanes is disposed between two successive rows of moving blades of the rotor. The stationary vanes of the nozzle serve to guide the gas flow coming from the rows of moving blades to take up appropriate speed and direction. Each stationary vane is constituted by a plurality of vane sections in alignment along a stacking axis and forming the vane profile.

In normal operation of the engine, the rotation of the shaft driving the compression part gives rise to an unbalance phenomenon. The unbalance leads to cyclical loading and vibration that the rotor communicates to the stator of the engine with significant risk of the engine being damaged. In the compressors, this unbalance phenomenon leads to orbital movement of the inner shroud due to its rotation. By the inner shroud making contact with the stationary vanes of the nozzle, this orbital movement is transmitted in the form of radial displacement which has the consequence of deforming the outer shroud to which the vanes are fixed. Furthermore, the fixed nozzle vanes subjected to such radial displacement bend and run the risk of breaking (buckling phenomenon).

In order to avoid excessive deformation of the outer shroud and to avoid breaking the vanes of the nozzle, the nozzle vanes generally have a profile with a C-shaped bend (also known as a sail-shape). Such a shape is characterized by the vane sections situated in the middle of the flow section being tangentially offset relative to lower and upper vane sections that are close to the inner and outer shrouds, thus serving to reduce the buckling strength of the nozzle vanes. A vane constituted by a stack of such sections is more flexible and can therefore absorb a fraction of the deformation energy transmitted by the inner shroud.

Nevertheless, sail-shaped slopes penalize the aerodynamic performance of the compressor, particularly in terms of surge margin. The tangential offset of the vane has the effect of reducing the angles between the blade and the outer and inner shrouds, and beyond a certain value this is aerodynamically penalizing for the compressor. The gas flow passing through the nozzle tends to migrate from the lower and upper sections of the vanes towards the centers thereof. This migration of flow is particularly harmful in terms of surge margin at the base of the vane (bottom sections).

OBJECT AND BRIEF SUMMARY OF THE INVENTION

The present invention thus seeks to mitigate such drawbacks by proposing a novel shape for a nozzle vane of reduced buckling strength, but without penalizing the aerodynamic performance of the nozzle.

To this end, the invention provides a nozzle vane for a rotary disk of a turbomachine, the vane presenting mutually orthogonal longitudinal, tangential, and radial axes, and having pressure side and suction side surfaces extending radially between a base and a tip, and longitudinally between a leading edge and a trailing edge, and a plurality of vane sections having centers of gravity in alignment along a stacking axis, said vane presenting a lower portion, an intermediate portion, and an upper portion, said lower portion extending radially between the base of the vane and a lower limit of the intermediate portion, and said upper portion extending radially between an upper limit of the intermediate portion and the tip of the vane, wherein the stacking axis presents, in the lower and upper portions, a tangential component that is substantially radial, and in the intermediate portion, a tangential component having two slopes.

Such a stack of vane sections thus makes it possible to conserve angles between the vane and the shrouds that are favorable to the surge margin of the compressor while increasing the tangential offset of the intermediate portion of the vane in order to make the vane more flexible in buckling. The lower and upper portions of the vane, which present a tangential component that is substantially radial, prevent the gas flow passing through the compressor from migrating excessively towards the intermediate portion, even when the vane deforms. The tangential offset of the intermediate portion of the vane also enables the buckling strength of the vane to be decreased.

Preferably, the tangential component of the stacking axis in said intermediate portion comprises a first slope in the direction opposite to the direction of rotation of the disk, and a second slope in the direction of rotation of said disk. The first slope may present an angle of inclination lying in the range 5° to 45°, and the second slope may present an angle of inclination likewise lying in the range 5° to 45°.

Advantageously, the tangential component of the stacking axis in the intermediate portion of the vane occupies a radial height lying in the range 35% to 65% of the total radial height between the base and the tip of the vane.

Also advantageously, the tangential component of the stacking axis of the lower portion of the vane occupies a radial height lying in the range 10% to 25% of the total radial height between the base and the tip of the vane. Similarly, the tangential component of the stacking axis of the upper portion of the vane advantageously occupies a radial height lying in the range 10% to 25% of the total radial height between the base and the tip of the vane.

BRIEF DESCRIPTION OF THE DRAWINGS

Other characteristics and advantages of the present invention appear from the following description given with reference to the accompanying drawings which show an embodiment having no limiting character. In the figures:

FIG. 1 is a fragmentary view in longitudinal section of a compression part of a gas turbine engine;

FIG. 3 is a diagram showing a tangential stacking axis for the sections of a vane of the invention.

DETAILED DESCRIPTION OF AN EMBODIMENT

Figure 2:
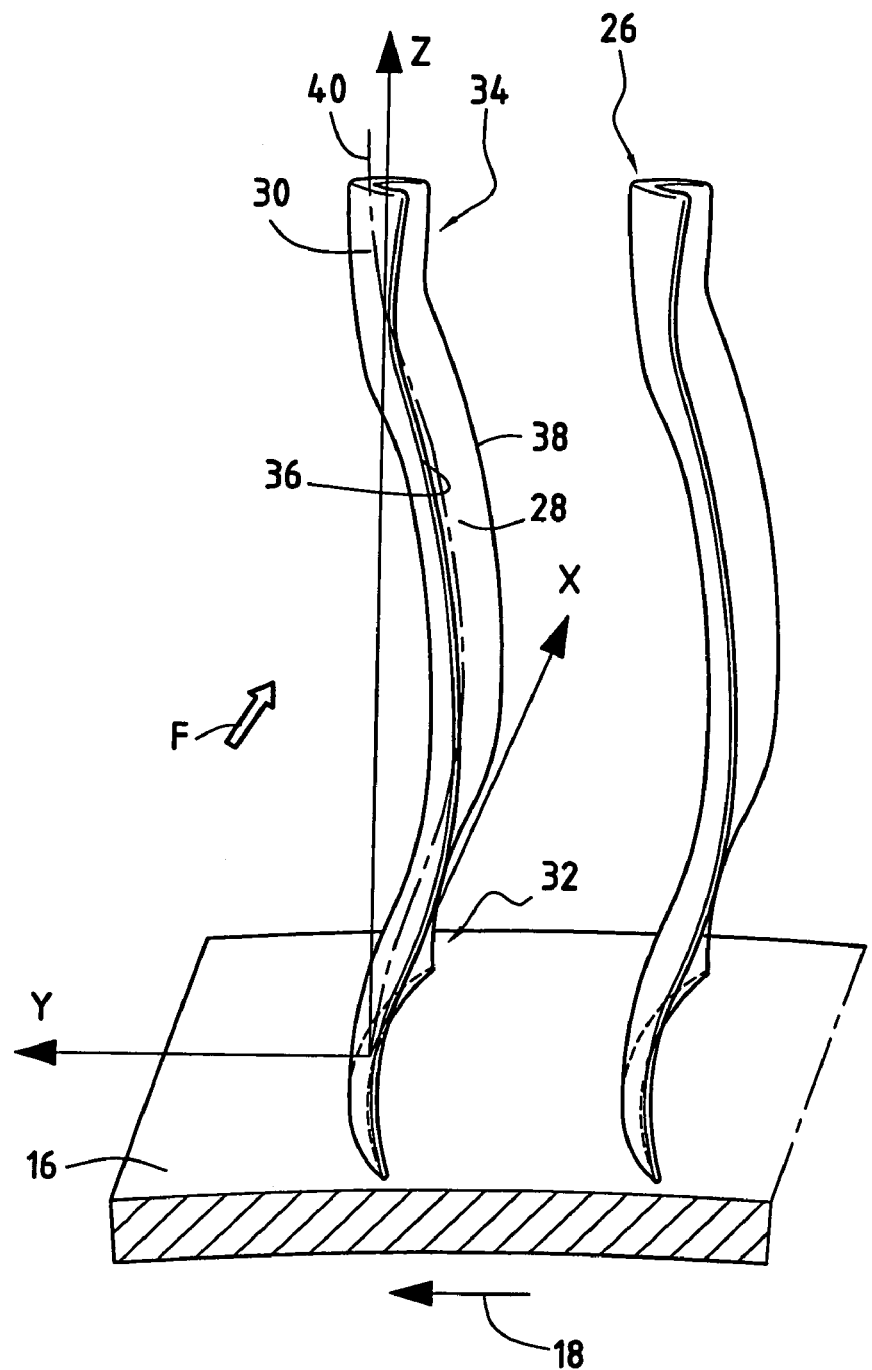
FIG. 2 is a fragmentary perspective view of a compression part including nozzle vanes of the invention.

FIG. 1 shows a portion of a compression part 10 in a gas turbine engine. This compression part presents an annular gas flow section 12 which extends axially through the compression part and radially between an outer shroud 14 of a stator and an inner shroud 16 of a rotor disk. The inner shroud is set into rotation about a longitudinal axis 17 of the engine in the direction indicated by arrow 18, while the outer shroud remains stationary. The travel direction of the gas flow passing through the compression part is represented by arrow F.

The rotor disk comprises a plurality of rows of moving blades 20 which extend radially through the flow section 12 from the inner shroud 16 to the vicinity of the outer shroud 14. Each moving blade 20 presents a root 22 of dovetail shape which is engaged in a recess 24 provided to receive it in the inner shroud 16. The stator comprises a plurality of rows of nozzle vanes 26 that are secured to the outer shroud 16 and that likewise extend across the flow section between the outer shroud and the inner shroud 14. Each nozzle vane 26 is made integrally with the outer shroud 16. Alternatively, the nozzle vanes 26 could likewise have respective roots for engaging in recesses in the outer shroud.

As shown in FIG. 2, each nozzle vane 26 is associated with three orthogonal axes: a longitudinal axis X; a tangential axis Y; and a radial axis Z. The longitudinal axis X extends in the flow direction F of the gas passing through the compression part. The tangential axis Y extends in the direction of rotation 18 of the inner shroud 16, and the radial axis Z extends radially from the inner shroud 16 towards the outer shroud.

Each nozzle vane 26 has a pressure side surface 28 and a suction side surface 30 extending firstly radially between a base 32 and a tip 34, and secondly axially between a leading edge 36 and a trailing edge 38. The nozzle vane 26 is also constituted by a plurality of vane sections (not shown in the figures) whose centers of gravity are stacked along a stacking axis 40 from the base 32 to the tip 34 of the vane.

In FIG. 3, the vane is subdivided along the radial axis Z into three portions: a lower portion 42a; an intermediate portion 42b; and an upper portion 42c. The lower portion 42a extends radially from the base of the vane up to a lower limit 44 of the intermediate portion 42b, and the upper portion 42c extends radially from an upper limit 46 of the intermediate portion to the tip of the vane.

FIG. 3 shows a tangential stacking axis of a FIG. 2 nozzle vane. More precisely, the axis 48 shown in this figure corresponds to a tangential component of the stacking axis 40 shown in FIG. 2, as projected onto the plane defined by the tangential axis Y and the radial axis Z of the vane.

In the invention, the stacking axis 40 of the sections of the nozzle vane 26 present, in the lower and upper portions 42a and 42c of the vane, a tangential component 48 that is substantially radial, and in the intermediate portion 42b, a tangential component 48 that presents two slopes. As shown in FIG. 3, the tangential component 48 of the stacking axis 40 in the lower and upper portions 42a and 42c of the vane extends parallel to the radial axis Z of the vane. In addition, the tangential component 48 of the stacking axis of the intermediate portion 42b of the vane presents first slope 50a at its lower limit 44 and second slope 50b at its upper limit 46. The first slope 50a preferably extends in the opposite direction to the direction of rotation 18 of the inner shroud 16, while the second slope 50b takes place in the direction of rotation 18.

According to an advantageous characteristic of the invention, the first slope presents an angle of inclination $\alpha$ with respect to axis Z lying in the range 5° to 45°, and the second slope presents an angle of inclination $\beta$ likewise lying in the range 5° to 45°.

The first slope 50a extends radially between the lower limit 44 of the intermediate portion 42b of the vane to a bend point 52 in the tangential component of the stacking axis, and the second slope 50b extends radially from said bend point to the upper limit 46 of the intermediate portion. Advantageously, the tangential component 48 of the stacking axis in the intermediate portion 42b of the vane extends over a radial height lying in the range 35% to 65% of the total radial height between the base and the tip of said vane.

According to another advantageous characteristic of the invention, the tangential component 48 of the stacking axis in the lower portion 42a of the vane extends over a radial height lying in the range 10% to 25% of the total radial height between the base and the tip of said vane. Similarly, the tangential component 48 of the stacking axis in the upper portion 42c of the vane advantageously extends over a radial height lying in the range 10% to 25% of the total radial height between the base and the tip of said vane.

The nozzle vane of the invention presents better ability to withstand the mechanical stresses to which it is subjected while conserving accessible aerodynamic performance. The reduction in the buckling strength of the vane is illustrated in particular by FIG. 3 where the dashed line shows the deformation that the vane can accept without breaking. Thus, in the event of unbalance, the nozzle vanes absorb a large portion of the deformation energy transmitted from the inner shroud, thus making it possible to limit damage of the outer shroud. By avoiding transfer of excessive mechanical force to the stationary portions of the engine, it is possible to reduce the dimensions of said stationary portions. In FIG. 3, it can also be seen that in the lower and upper portions of the vane, the deformation that the vane can accept decreases the angle between the vane and the outer and inner shrouds to a small extent only. This limitation of the angle between the vane and the shrouds prevents the flow of gas passing through the nozzle from migrating excessively towards the intermediate portion of the vane, thereby conserving acceptable aerodynamic performance.

What is claimed is:

1. A nozzle vane for a turbomachine, the vane presenting mutually orthogonal longitudinal, tangential, and radial axes, and having pressure side and suction side surfaces extending radially between a base and a tip, and longitudinally between a leading edge and a trailing edge, and a plurality of vane sections having centers of gravity in alignment along a stacking axis, said vane presenting a lower portion, an intermediate portion, and an upper portion, said lower portion extending radially between the base of the vane and a lower limit of the intermediate portion, and said upper portion extending radially between an upper limit of the intermediate portion and the tip of the vane, wherein the stacking axis presents, in the lower and upper portions, a tangent line that is substantially radial, and in the intermediate portion, at least two tangent lines having different slopes.

2. A vane according to claim 1, wherein the tangential component of the stacking axis, in said intermediate portion, comprises a first slope in the direction opposite to the direction of rotation of the disk, and a second slope in the direction of rotation of said disk.

3. A vane according to claim 2, wherein said first slope presents an angle of inclination with respect to the radial direction lying in the range 5° to 45°.

4. A vane according to claim 2, wherein said second slope presents an angle of inclination with respect to the radial direction lying in the range 5° to 45°.

5. A vane according to claim 2, wherein said first slope extends radially between the lower limit of the intermediate portion and a bend point situated between the lower and upper limits of said intermediate portion, and said second slope extends radially between said bend point and said upper limit.

6. A vane according to claim 5, wherein the tangential component of the stacking axis of the intermediate portion occupies a radial height lying in the range 35% to 65% of a total radial height between the base and the tip of said vane.

7. A vane according to claim 1, wherein the tangential component of the stacking axis of the lower portion occupies a radial height lying in the range 10% to 25% of a total radial height between the base and the tip of said vane.

8. A vane according to claim 1, wherein the tangential component of the stacking axis of the upper portion occupies a radial height lying in the range 10% to 25% of a total radial height between the base and the tip of said vane.

9. A vane according to claim 1, wherein the vane is a stationary vane of a compressor of the turbomachine, the vane is only connected to the turbomachine at the upper portion of the vane, and the upper portion of the vane is connected to an outer shroud of a stator of the compressor.

10. A vane according to claim 1, wherein the lower portion of the vane extends to a location proximate an inner shroud of a rotor disk of a compressor of the turbomachine without being connected to the inner shroud, and the rotor disk is configured to rotate around the longitudinal axis of the turbomachine.

11. A nozzle vane for a turbomachine, the vane presenting mutually orthogonal longitudinal, tangential, and radial axes, and having pressure side and suction side surfaces extending radially between a base and a tip, and longitudinally between a leading edge and a trailing edge, and a plurality of vane sections having centers of gravity in alignment along a stacking axis, said vane presenting a lower portion, an intermediate portion, and an upper portion, said lower portion extending radially between the base of the vane and a lower limit of the intermediate portion, and said upper portion extending radially between an upper limit of the intermediate portion and the tip of the vane, wherein the stacking axis presents, in the lower and upper portions, a tangent line which extends parallel to the radial axis of the vane, and in the intermediate portion, at least two tangent lines having different slopes, said intermediate portion having a C-shaped form.

12. A vane according to claim 11, wherein the tangential component of the stacking axis, in said intermediate portion, comprises a first slope in the direction opposite to the direction of rotation of the disk, and a second slope in the direction of rotation of said disk.

13. A vane according to claim 12, wherein said first slope presents an angle of inclination with respect to the radial direction lying in the range 5° to 45°.

14. A vane according to claim 12, wherein said second slope presents an angle of inclination with respect to the radial direction lying in the range 5° to 45°.

15. A vane according to claim 12, wherein said first slope extends radially between the lower limit of the intermediate portion and a bend point situated between the lower and upper limits of said intermediate portion, and said second slope extends radially between said bend point and said upper limit.

16. A vane according to claim 15, wherein the tangential component of the stacking axis of the intermediate portion occupies a radial height lying in the range 35% to 65% of a total radial height between the base and the tip of said vane.

17. A vane according to claim 11, wherein the tangential component of the stacking axis of the lower portion occupies a radial height lying in the range 10% to 25% of a total radial height between the base and the tip of said vane.

18. A vane according to claim 11, wherein the tangential component of the stacking axis of the upper portion occupies a radial height lying in the range 10% to 25% of a total radial height between the base and the tip of said vane.

19. A vane according to claim 11, wherein the vane is a stationary vane of a compressor of the turbomachine, the vane is only connected to the turbomachine at the upper portion of the vane, and the upper portion of the vane is connected to an outer shroud of a stator of the compressor.

20. A vane according to claim 11, wherein the lower portion of the vane extends to a location proximate an inner shroud of a rotor disk of a compressor of the turbomachine without being connected to the inner shroud, and the rotor disk is configured to rotate around the longitudinal axis of the turbomachine.

* * * * *